United States Patent
Paulson et al.

(10) Patent No.: US 9,466,069 B2
(45) Date of Patent: *Oct. 11, 2016

(54) ENHANCED CAMPAIGN MANAGEMENT SYSTEMS AND METHODS

(75) Inventors: Jedediah H. Paulson, San Mateo, CA (US); Nella Shapiro, Mountain View, CA (US); Sandeep K. Tukhar, Sunnyvale, CA (US); Kelly Xinxin Wu, San Jose, CA (US)

(73) Assignee: eBay Inc., San Jose, CA (US)

( * ) Notice: Subject to any disclaimer, the term of this patent is extended or adjusted under 35 U.S.C. 154(b) by 965 days.

This patent is subject to a terminal disclaimer.

(21) Appl. No.: 12/617,562

(22) Filed: Nov. 12, 2009

(65) Prior Publication Data

US 2010/0153196 A1    Jun. 17, 2010

Related U.S. Application Data

(63) Continuation-in-part of application No. 11/583,563, filed on Oct. 19, 2006, now Pat. No. 8,892,756.

(51) Int. Cl.
*H04L 29/08* (2006.01)
*G06Q 30/02* (2012.01)
*G06Q 50/18* (2012.01)

(52) U.S. Cl.
CPC .......... *G06Q 30/0251* (2013.01); *G06Q 30/02* (2013.01); *G06Q 30/0207* (2013.01); *G06Q 30/0211* (2013.01); *G06Q 50/188* (2013.01); *H04L 67/02* (2013.01); *G06Q 30/0241* (2013.01); *G06Q 30/0272* (2013.01)

(58) Field of Classification Search
CPC .. H04L 67/02; G06Q 30/02; G06Q 30/0207; G06Q 30/0211; G06Q 30/0241; G06Q 30/0251; G06Q 30/0272; G06Q 50/188
See application file for complete search history.

(56) References Cited

U.S. PATENT DOCUMENTS

| | | | |
|---|---|---|---|
| 6,125,352 A * | 9/2000 | Franklin et al. | 709/217 |
| 6,405,175 B1 * | 6/2002 | Ng | G06Q 30/02 705/14.26 |
| 6,839,680 B1 * | 1/2005 | Liu et al. | 705/7.33 |
| 6,941,306 B2 * | 9/2005 | Kim | 707/E17.005 |

(Continued)

OTHER PUBLICATIONS

U.S. Appl. No. 11/583,563, Non-Final Office Action mailed Jul. 22, 2010, 27 pgs.

(Continued)

*Primary Examiner* — Patrice Winder
(74) *Attorney, Agent, or Firm* — Schwegman, Lundberg & Woessner, P.A.

(57) ABSTRACT

One exemplary embodiment of the disclosure provides a method to publish campaign data in an electronic environment. The exemplary method includes querying a database to select campaign metadata ready to publish to a target channel system and determining a plurality of value users as a subset of all end users. The value users are determined so that one or more coupons are automatically generated and distributed to each of the value users. A value of the coupon is based on a set of pre-defined criteria including a volume of business generated by the value user or how negatively impacted the value user was based on a negative purchase experience (e.g., product not as described or never received). The target channel system is selected from a plurality of channel systems based on a target indicating attribute of the campaign metadata. The packaged campaign metadata is transferred to the target channel system.

20 Claims, 6 Drawing Sheets

(56) References Cited

U.S. PATENT DOCUMENTS

| | | | |
|---|---|---|---|
| 7,313,359 B2 | 12/2007 | Steelberg et al. | |
| 7,822,631 B1* | 10/2010 | Vander Mey et al. | 705/7.29 |
| 8,103,540 B2* | 1/2012 | Gross | G06Q 30/02 |
| | | | 705/7.33 |
| 8,352,499 B2* | 1/2013 | Bharat et al. | 707/802 |
| 8,412,557 B1* | 4/2013 | Lloyd et al. | 705/7.29 |
| 8,892,756 B2 | 11/2014 | Paulson | |
| 2002/0049738 A1* | 4/2002 | Epstein | G06F 17/30997 |
| | | | 707/999.001 |
| 2002/0128908 A1* | 9/2002 | Levin et al. | 705/14 |
| 2003/0014304 A1* | 1/2003 | Calvert et al. | 705/14 |
| 2004/0268344 A1* | 12/2004 | Obilisetty | 717/175 |
| 2007/0088603 A1* | 4/2007 | Jouppi et al. | 705/14 |
| 2007/0101439 A1* | 5/2007 | Strauch et al. | 726/28 |
| 2008/0097928 A1 | 4/2008 | Paulson | |
| 2009/0197582 A1* | 8/2009 | Lewis et al. | 455/414.2 |

OTHER PUBLICATIONS

U.S. Appl. No. 11/583,563, Response filed Oct. 22, 2010 to Non Final Office Action mailed Jul. 22, 2010, 17 pgs.
U.S. Appl. No. 11/583,563 , Response filed Nov. 15, 2011 to Non Final Office Action mailed Aug. 19, 2011, 11 pgs.
U.S. Appl. No. 11/583,563 Advisory Action mailed Apr. 8, 2011, 3.
U.S. Appl. No. 11/583,563, Final Office Action mailed Jan. 21, 2011, 26 pgs.
U.S. Appl. No. 11/583,563, Final Office Action mailed Mar. 6, 2012, 25 pgs.
U.S. Appl. No. 11/583,563, Non Final Office Action mailed Aug. 19, 2011, 24 pgs.
U.S. Appl. No. 11/583,563, Response filed Mar. 21, 2011 to Final Office Action mailed Jan. 21, 2011, 11 pgs.
U.S. Appl. No. 11/583,563, 312 Amendment filed Jul. 28, 2014, 7 pgs.
U.S. Appl. No. 11/583,563, Non Final Office Action mailed Jan. 6, 2014, 26 pgs.
U.S. Appl. No. 11/583,563, Notice of Allowance mailed Jul. 8, 2014, 8 pgs.
U.S. Appl. No. 11/583,563, PTO Response to Rule 312 Communication mailed Sep. 2, 2014, 2 pgs.
U.S. Appl. No. 11/583,563, Response filed Apr. 9, 2014 to Non Final Office Action mailed Jan. 6, 2014, 10 pgs.
U.S. Appl. No. 14/543,661, Preliminary Amendment filed Dec. 5, 2014, 8 pgs.

* cited by examiner

| CAMPAIGN CODE | CAMPAIGN NAME | START DATE | END DATE | SITE | OBJECTIVE | INITIATIVE | TRACKING DURATION | PROGRAM TYPE | CHANNEL INDICATOR |
|---|---|---|---|---|---|---|---|---|---|
| 1001 | US_ToysMonthlyBuyer_08162006_JP | 8162006 | 8162006 | US | INCREASE PURCHASE IN TOYS CATEGORY | BUYER ACTIVITY | 7 DAYS | BUYER MERCHANDISING | KCI |

*FIG. 2*

| OFFER CODE | NAME | DESCRIPTION | START DATE | END DATE | VALUE | CONTACT CHANNEL |
|---|---|---|---|---|---|---|
| 2000001 | US_ToysNewHotItem_08162006_JP | NEW OFFER FOR THE HOTTEST TOY ON eBAY | 8162006 | 8232006 | $0 | EMAIL |
| 2000002 | ApparelNewHotItem_08162006_JP | NEW OFFER FOR THE HOTTEST APPAREL ON eBAY | 8162006 | 8232006 | $0 | EMAIL |
| 2000003 | US_ToysNewHotItem_08162006_JP | NEW OFFER FOR THE HOTTEST APPAREL ON eBAY | 8162006 | 8232006 | $0 | POSTAL |

*FIG. 3*

UAC CONTACT HISTORY

| USER_ID | TRACKING_CD | RUN_DT | OFFER_CD |
|---|---|---|---|
| 800000001 | T0001-00 | 2006-08-28 | 10001 |
| 800000002 | B0002-00 | 2006-08-29 | 10002 |

FIG. 4

User Information

| user_id | user_selected_id | user_status_code | user_country_code | user_feedback_score | user_paypal_id |
|---|---|---|---|---|---|
| 10122334 | jammasterjed | active | usa | 23 | payjedpal |
| 10122335 | bigauctionman | suspended | germany | 45 | bigpaytime |
| 20344556 | tomselectrons | active | uk | 1003 | 999 |

FIG. 5

ENHANCED CAMPAIGN MANAGEMENT SYSTEMS AND METHODS

CROSS-REFERENCE TO RELATED APPLICATIONS

This application claims priority benefit of U.S. application Ser. No. 11/583,563, entitled, "Method and System of Publishing Campaign Data," filed Oct. 19, 2006, now U.S. Pat. No. 8,892,756 as a continuation-in-part application.

TECHNICAL FIELD

The present application relates generally to the technical field of data publishing and, more particularly, to systems and methods for publishing marketing campaign data from a database to campaign distribution systems.

BACKGROUND

With the development of network technologies, business users may use networks and communication links to carry marketing campaigns to prospective customers.

Campaign generation systems allow business users to create, edit and save or store campaign metadata. Channel systems such as, for example, email, direct mail, website advertising placements, website email, and outbound call systems are normally used by business users to distribute campaign information to potential customers. The channel systems can be owned and managed by different facilities.

Current campaign generation systems may have insufficient integration capabilities to send both campaign user lists and campaign information, which often includes offer metadata to downstream channel systems or content editing systems. Because of this, a business user may have to create campaign related information in the campaign generation system, and then login to the downstream systems, recreate the campaign related information, and then trigger the distribution of the campaigns to the targeted customers. Improved systems would eliminate duplicate data entry, prevent data errors, increase productivity of business users and shorten delays in campaign delivery to target customers.

BRIEF DESCRIPTION OF THE DRAWINGS

Some exemplary embodiments are illustrated by way of example and not limitation in the Figs. of the accompanying drawings in which:

FIG. 2 illustrates a data structure of a campaign table in accordance with an exemplary embodiment;

FIG. 3 illustrates a data structure of an offer table in accordance with an exemplary embodiment;

FIG. 4 illustrates data a structure of a user contact history table in accordance with an exemplary embodiment;

FIG. 5 illustrates a data structure of a user information table in accordance with an exemplary embodiment;

DETAILED DESCRIPTION

Exemplary methods and systems to publish campaign and related user lists to existing and potential customers are described. The description that follows includes illustrative systems, methods, techniques, instruction sequences, and computing machine program products that embody the present invention. In the following description, for purposes of explanation, numerous specific details are set forth to provide an understanding of various embodiments of the inventive subject matter. It will be evident, however, to those skilled in the art that embodiments of the inventive subject matter may be practiced without these specific details. Further, well-known instruction instances, protocols, structures, and techniques have not been shown in detail.

As used herein, the term "or" may be construed in either an inclusive or exclusive sense. Similarly, the term "exemplary" is construed merely to mean an example of something or an exemplar and not necessarily a preferred or ideal means of accomplishing a goal. Additionally, although various exemplary embodiments discussed below focus on end-user campaigns in an electronic retail environment, the embodiments are given merely for clarity in disclosure. Thus, any type of electronic commerce or electronic business system and method, including various system architectures, may employ various embodiments of the end-user campaign system and method described herein and is considered as being within a scope of the present invention.

Exemplary embodiments of the invention can publish campaign related metadata created by marketer business users to potential customers. As used herein, "campaign information" is marketing material sent to segmented customers with a goal of influencing the segmented customers' behavior, for example, attracting the segmented customers to buy a manufacturer's specific products. As used herein, "metadata" are data that define other data, and "user lists" are lists that uniquely identify customers targeted for marketing campaigns. In a specific exemplary embodiment defined herein, metadata are sent in the header information of a packet such that everything is sent in a single file.

The exemplary embodiments of the invention can determine how to package the campaign metadata based on the configurations and requirements of the target channel systems. Exemplary embodiments of the invention can also be used to validate the user lists which will be sent to potential customers.

Figure 1:
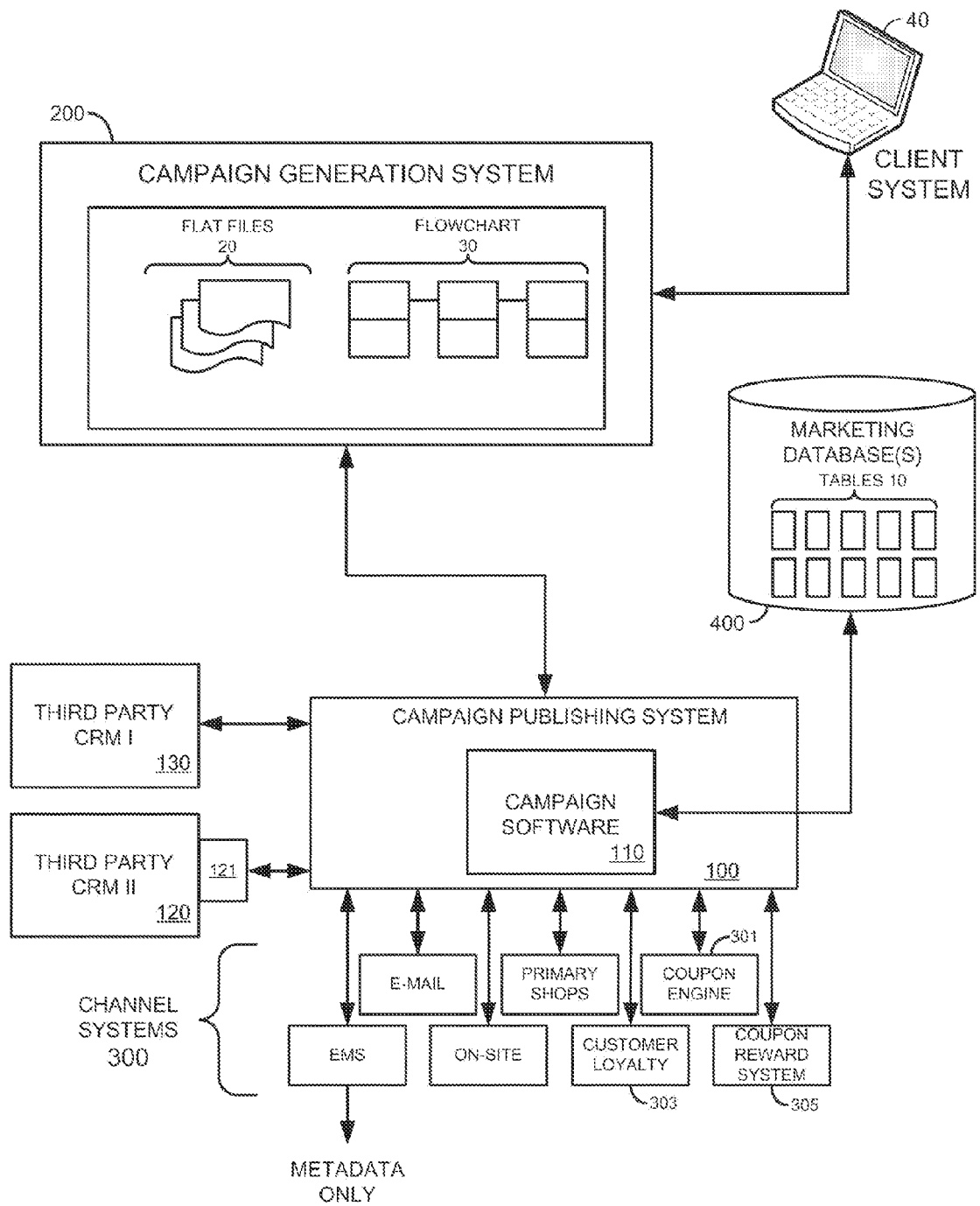
FIG. 1 is an overview block diagram illustrating a context of a campaign publishing system in accordance with an exemplary embodiment.

FIG. 1 is an overview block diagram illustrating the context of a campaign publishing system 100 in accordance with an exemplary embodiment of the invention. The campaign publishing system 100 includes campaign software 110 and communicates over direct connections or networked connections to a campaign generation system 200 and a plurality of channel systems 300 (only a few of which are shown explicitly). Exemplary embodiments of the present disclosure are described within the context of the campaign generation system 200 and several content editing systems and the plurality of channel systems 300. However, it will be appreciated by those skilled in the art that exemplary embodiments of the invention may include many different types of campaign generation systems, channel systems, and content management systems.

In a specific exemplary embodiment, the campaign generation system 200 is a system available in the market, such as, for example, "Unica Affinium Campaign" of Unica Co. The plurality of channel systems 300 are systems for distribution of email, direct mail, eBay website advertising placement on eBay.com, eBay MyMessages on eBay.com, which may be available in the market or have been custom built by eBay.com, and other channel systems known independently in the art.

In an exemplary embodiment, an exemplary one of the plurality of channel systems 300 is a Customer Relationship Management (CRM) system used to track and manage inbound and outbound phone calls, such as a product produced by SalesForce.com. In another exemplary embodiment, an exemplary one of the plurality of channel systems 300 is a CRM system used to track and manage inbound and outbound phone calls. Additionally, the campaign publishing system 100 can use web service technologies, known independently in the art. For example, the campaign publishing system 100 can create an XML request (described in more detail, below) with a user list being sent to SalesForce.com.

In a specific exemplary embodiment, a first third party CRM 130 can be managed by SAP AG or SAP America, Inc., and a second third party CRM 120 can be managed by an Oracle Corporation CRM. In the case of an XML file being sent to, for example, the second third party CRM 120, an API web service 121 may be used as an interface. Electronic communications with each of the third party CRMs can be accomplished through an interface port (not shown directly but known independently to one of skill in the art) coupled to the campaign publishing system 100.

In an exemplary embodiment, the campaign publishing system 100 may access a database 400 as shown in FIG. 1. The database 400 can be located within or in proximity to the campaign publishing system 100 or, alternatively, with either the first 130 or second 120 third party CRM. The campaign publishing system 100 reads from and writes to the database 400. The database 400 includes a plurality of tables 10, such as campaign data or metadata. The campaign publishing system 100 also creates and writes to one or more flat files 20.

In some exemplary embodiments, the flat files 20 are stored in the campaign generation system 200. In other exemplary embodiments, the flat files 20 are stored on the database 400. The plurality of tables 10 is used to store metadata of a marketing campaign, for example, offer details, user information, and user campaign contact history. A flat file is used to store customer data, for example, potential target customer information for a marketing campaign.

As discussed above, in a specific exemplary embodiment defined herein, metadata are sent in the header information of a packet such that everything is sent in a single file. In contrast, certain prior art systems could only send metadata first, wait for a response, and then send the associated flat file.

Preparation for Publishing Campaign Metadata and Related User Lists

Before publishing the campaign metadata and user lists to a plurality of systems via the campaign publishing system 100, a campaign marketer may prepare marketing campaign related data by utilizing the campaign generation system 200. The campaign marketer may log into the campaign generation system 200 through a client computer 40, which communicates with the campaign generation system 200 through one or more various types of networks (not shown).

For example, the campaign marketer may enter, update, and save campaign and offer metadata to relevant ones of the plurality of tables 10 in the database 400.

For instance, assume that a campaign marketer wants to create a new marketing campaign to be sent to all eBay customers who have purchased a toy on eBay.com in the last three months. The marketing campaign is to be sent through an eBay channel system, for example, one which is responsible for sending email campaigns to eBay customers.

In some exemplary embodiments, the marketing campaign is also intended to be sent to an external company responsible for sending postal direct mail campaigns to eBay customers. In other exemplary embodiments, the campaign is to be sent to customer support systems for use in outbound telephone calls to eBay customers. In other exemplary embodiments, the campaign is to be displayed as marketing advertisements to targeted customers on eBay.com.

The campaign marketer may create a new campaign by using a campaign creation page in the campaign generation system 200, and then save the campaign in a campaign table 10. After the creation of the metadata for the campaign, in some circumstances, the campaign marketer may update it by changing the status of a campaign from "New" to "Ready to Publish" and saving the campaign.

For example, the campaign publishing system 100 can automatically launch and e-mail or distribute one or more coupons to a particular subset of end users. The subset of end users is selected based on pre-defined criteria, such as high volume buyers or sellers, or buyers that are negatively impacted due to, for example, improperly described products, products never received, or products that are damaged as received. An additional set of pre-defined criteria is used to determine a value of the coupons distributed to the subset of end users.

A coupon engine 301 interfaces through the campaign publishing system 100 and the database 400. Either high volume users or negatively impacted users are identified as value users. Depending upon either a volume level or a severity of the negative impact to a user, coupons are e-mailed or otherwise sent through one of the plurality of channel systems 300 to the value users, either directly or through the first 130 or second 120 third party CRM services.

The coupons can be redeemed through, for example, a customer loyalty engine 303 (e.g., applying credit or other incentives). Alternatively or additionally, the coupons can also be redeemed through a coupon reward system 305 that is tied to, for example, a Paypal Incentive Engine (PIE, not shown). The coupons redeemed through the PIE can be used with a PayPal account (PayPal, Inc. is a division of eBay and is located in San Jose, Calif.).

FIG. 2 illustrates the data structure of a campaign table in accordance with an exemplary embodiment. For instance, the campaign marketer may enter the attributes, i.e., campaign metadata for a campaign, as illustrated in FIG. 2. The unique campaign code of the campaign is automatically created by the campaign generation system 200.

FIG. 3 illustrates the data structure of an offer table in accordance with an exemplary embodiment. For instance, the campaign marketer may create new offers by using an offer creation page in the campaign generation system 200, and then save the offers in an offer table 10. The unique offer code of each offer metadata is created automatically by the campaign generation system 200.

FIG. 4 illustrates the data structure of a user campaign contact history table in accordance with an exemplary embodiment.

FIG. 5 illustrates data a structure of a user information table in accordance with an exemplary embodiment.

In some exemplary embodiments, the campaign marketer may use the campaign generation system 200 to create and save the campaign flowchart 30 in the campaign generation system 200. The campaign flowchart 30 corresponds to a query or series of consecutive queries to the database 400, which can be performed by using conventional DBMS skills to meet certain business requirements. For example, in some exemplary embodiments, the campaign marketer may choose to build the campaign flowchart 30 which contains a query to the user_information table. In some exemplary embodiments, the campaign marketer may select all buyers who have opted out of email communications. The campaign marketer may merge the two selects together, so the resulting output is the intersect of all toys buyers minus all who have opted out. After that, the campaign marketer may feed this result into a sample box, which will allow for segmenting and uniquely tracking members of a "holdout" population who are eligible but will not be sent the communication in order for the business to calculate changes in customer behavior due to a campaign.

In some exemplary embodiments, the campaign generation system 200 may allow a campaign marketer to create user lists and to merge different customer segments (for example, all customers who bought in the Toys category on eBay with all customers who live in California) as well as exclude segments (for example, remove all customers who bought in the Apparel category) to generate a final list of customers and their email addresses. The user list can be the output of the campaign generation system 200.

Figure 6:
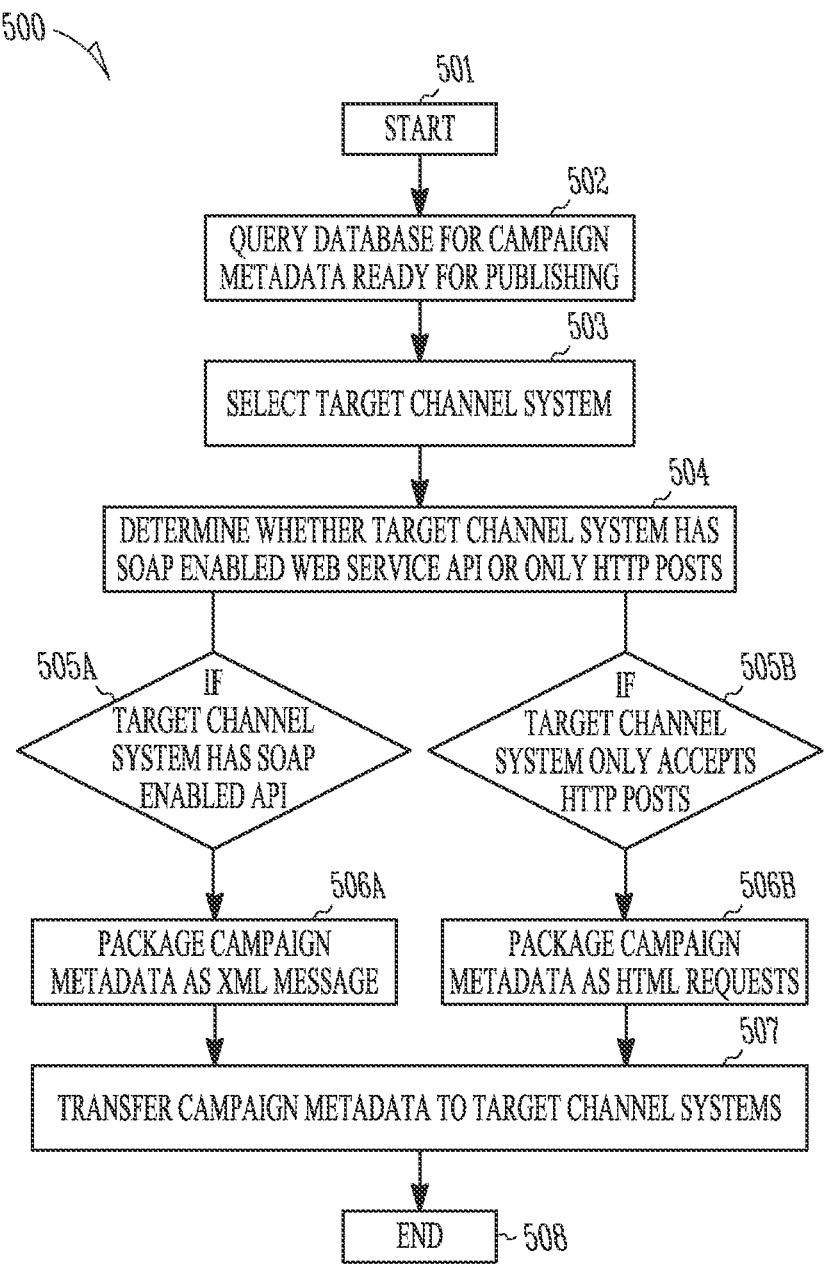
FIG. 6 is a flowchart illustrating a method of publishing campaign metadata of a campaign from a database to a plurality of channel and content editing systems in accordance with an exemplary embodiment.

With reference concurrently to FIGS. 1 and 6, a method 500 of publishing campaign metadata of a campaign from database 400 to a plurality of channel systems 300 in accordance with an exemplary embodiment. In an exemplary embodiment, at step 501, the method 500 initiates the process of publishing campaign metadata. In an exemplary embodiment, for all campaigns, the campaign marketer initiates the process of publishing campaign metadata by saving a campaign with an attribute of "ready to publish." The campaign is saved in the database 400 and the campaign generation system 200. In an exemplary embodiment, a campaign flowchart 30 (see FIG. 1) is saved in the campaign generation system 200.

In an exemplary embodiment, a the campaign flowchart 30 is run once from the campaign generation system 200. In another exemplary embodiment, an external system calls the campaign generation system 200 by using an exposed API of the campaign generation system 200 to run the campaign flowchart 30. In an exemplary embodiment, the call is done daily for a campaign, for example, "Welcome new eBay users" campaign, which is sent to all newly registered users each night.

In an exemplary embodiment, metadata is published by saving the campaign and setting the channel attribute (for example, email, mail, phone) to "ready to publish." The publishing is only done once per campaign, unless it is intended to update metadata, for example, to change the end date of the campaign.

At step 502, the campaign publishing system 100 queries a campaign table 10 in the database 400 to select campaign metadata with status "ready to publish." Each campaign metadata includes a channel indicator attribute to indicate a target one or ones of the plurality of channel systems 300, thus the campaign publishing system 100 knows to which one of the plurality of channel systems 300 to publish the selected campaign metadata.

At step 503, the campaign publishing system 100 selects a target one or ones of the plurality of channel systems 300 from a plurality of channel systems 300 based on the target indicator attribute of the campaign metadata.

At step 504, the campaign publishing system 100 determines whether the target one or ones of the plurality of channel systems 300 has a Simple Object Access Protocol (SOAP) enabled web service Application Programming Interface (API) or whether the target one or ones of the plurality of channel systems 300 only accepts Hypertext Transfer Protocol (HTTP) posts.

At step 505A, if the campaign publishing system 100 determines that the target one or ones of the plurality of channel systems 300 has a SOAP enabled web service API, then at step 506A the campaign publishing system 100 packages the campaign metadata as an Extensible Markup Language (XML) message object.

Otherwise, at step 505B, if the campaign publishing system 100 determines that the target one or ones of the plurality of channel systems 300 only accepts HTTP posts, then at step 506B the campaign publishing system 100 packages the campaign metadata as a Hypertext Markup Language (HTML) request.

At step 507, the campaign publishing system 100 transfers all the packaged campaign metadata to the target one or ones or ones of the plurality of channel systems 300. In some exemplary embodiments, the campaign publishing system 100 transfers the XML message object to the target one or ones or ones of the plurality of channel systems 300 using SOAP over HTTP protocol. In some exemplary embodiments, the campaign publishing system 100 transfers the HTML request to the target one or ones of the plurality of channel systems 300 over HTTP protocol. At step 508, the method 500 of publishing the campaign metadata stops.

In an exemplary embodiment, after the step 502, the campaign publishing system 100 aggregates one or more offers and corresponding metadata to the selected campaign and campaign metadata. In an exemplary embodiment, the campaign publishing system 100 handles system errors of each step by sending email alerts to a support team and logging system errors to log files.

In an exemplary embodiment, after the campaign metadata has been transferred successfully, the campaign publishing system 100 updates the status of all the transferred campaign metadata in the database 400 to "successful" to identify that such campaign metadata has been transferred successfully.

Figure 7:
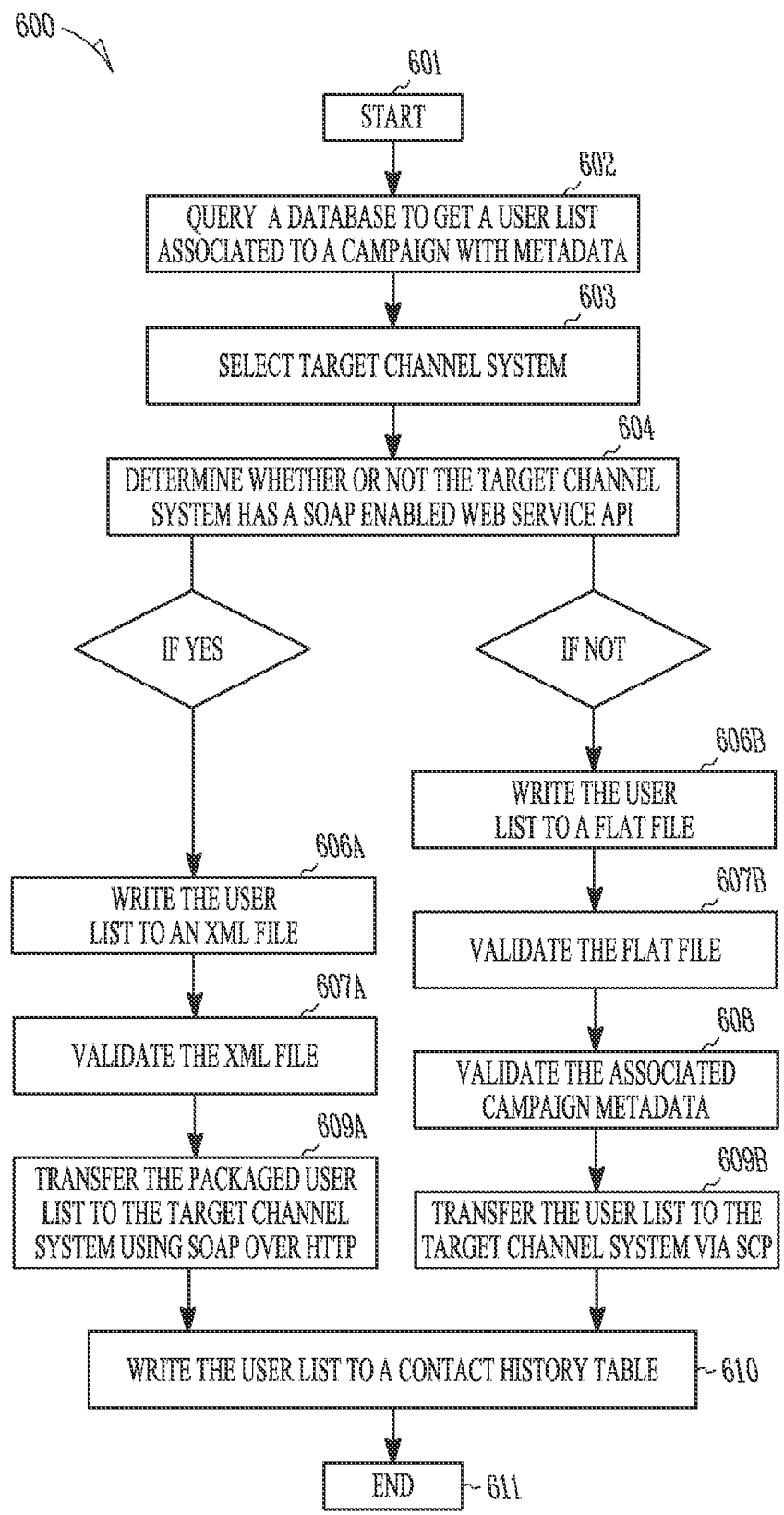
FIG. 7 is a flowchart illustrating a method of publishing a user list for a marketing campaign from a database to a plurality of channel systems in accordance with an exemplary embodiment.

Referring now concurrently to FIGS. 1 and 7, a method 600 of publishing a user list for a marketing campaign from a database 400 to a plurality of channel systems 300 in accordance with an exemplary embodiment of the present disclosure.

In an exemplary embodiment, for a one-time campaign sent only once to customers, at step 601, the campaign marketer initiates the process of publishing user lists for a marketing campaign by running the flowchart 30. In some exemplary embodiments, the campaign flowchart 30 is saved in the campaign publishing system 100. In other exemplary embodiments, the campaign flowchart 30 is saved in the database 400.

In another exemplary embodiment, at step 601, for a recurring campaign, the process of publishing user lists for a marketing campaign is initiated by a "cron job" run periodically, for example, weekly, daily, or every 5 minutes. In an exemplary embodiment, the cron job is located within campaign publishing system 100. In another exemplary embodiment, the cron job is located in an external system, for example, campaign generation system 200.

At step 602, the campaign publishing system 100 queries the database 400 to obtain user lists of customer data meeting certain business requirements. In an exemplary embodiment, the user list obtained is associated to a campaign which has campaign metadata. The campaign metadata includes a channel indicator attribute, for example, "KC1" (see FIG. 2) to indicate a target one or ones of the plurality of channel systems 300, accordingly the campaign publishing system 100 uses this channel indicator attribute to identify which one or ones of the plurality of channel systems 300 to publish a selected user list.

At step 603, the campaign publishing system 100 selects a target one or ones of the plurality of channel systems 300 based on the channel indicator attribute included in the campaign metadata.

At step 604, the campaign publishing system 100 uses internal configuration properties to determine whether or not the target one or ones of the plurality of channel systems 300 has a SOAP enabled web service API.

If the target one or ones of the plurality of channel systems 300 is SOAP enabled, the campaign publishing system 100 writes the user list to an XML file at step 606A, validates the XML file at step 607A, and transfers the packaged user list to the target one or ones of the plurality of channel systems 300 at step 609A using SOAP over HTTP protocol.

If it is not SOAP enabled, the campaign publishing system 100 writes the user list to the flat files 20 at step 606B, validates the flat files 20 at step 607B, validates the associated campaign metadata at step 608, and transfers the user list to the target one or ones of the plurality of channel systems 300 by copying the flat files 20 to the target one or ones of the plurality of channel systems 300 via a Secure Copying Protocol (SCP) at step 609B.

At step 607A and 607B mentioned above, the campaign publishing system 100 validates the XML file and the flat files 20. In some exemplary embodiments, the publishing process will be aborted and an email alert will be sent to a system administrator, if the campaign publishing system 100 finds any of the following cases exist: (1) the XML file or the flat files 20 are empty; (2) the XML file or the flat files 20 do not contain all required fields for the targeted channel system; or (3) any of the required fields in the XML file or the flat files 20 are not in valid format. For example, no spaces or invalid characters exist in the following fields of the XML file or the flat files 20: email address, address (city, state, address1, and address2), offer version, Segment_ID. In an exemplary embodiment, if any of the invalidations in the XML file or the flat files 20 are found, the campaign publishing system 100 will stop the publishing process and will send errors to an administrator.

In an exemplary embodiment, at step 609B mentioned above, the campaign publishing system 100 validates if the metadata of the flat files 20 matches the metadata of the associated campaign which has been successfully published to a targeted one or ones of the plurality of channel systems 300. If they do not match, in an exemplary embodiment, the campaign publishing system 100 will send errors to an administrator.

At step 610, after transferring the user list to the target of the plurality of channel systems 300, the campaign publishing system 100 writes the user list to a contact history table. In some exemplary embodiments, the contact history table is saved in the database 400 (including, for example, marketing information) for reporting and for customer suppression in subsequent marketing campaigns. At step 611, the process of publishing the user lists to the target channel system ends.

With reference again to FIGS. 1 to 3 concurrently, a specific exemplary embodiment illustrates how to use the campaign publishing system 100 to publish a marketing campaign to potential customers. A campaign marketer logs in to the campaign generation system 200, navigates to a campaign created earlier, opens the campaign flowchart and selects "Edit." Then, the marketer edits the flowchart.

For example, the campaign marketer builds customer segments via a query to the user_information table according to the business requirements for certain marketing purposes. The campaign marketer also selects all buyers who have opted out of email communication. The campaign marketer merges the two selects together, so a resulting output is an intersection of all ebay.com toys buyers minus all opt outs. The campaign marketer feeds this result into a sample box, which allows the marketer to segment out a holdout population. The holdout population is a group of customers who are selectively removed from the campaign in order for eBay to evaluate the effectiveness of the campaign, for example, the amount of purchases by customers who were eligible and did receive the campaign versus the amount of purchases by customers that were eligible but did not receive campaign.

The campaign marketer selects two mail list boxes and in the first, named "email output," assigns the previously created email offers to the Toys customer segment. The campaign marketer uses the second titled "postal output," and assigns the postal offer to the same segment of Toys customers. The campaign marketer uses a third mail list box to represent the "hold out" segment, and assigns the Holdout offer to the holdout segment.

At this point the campaign flowchart 30 is built, and when run, will query the database for the customer segment according to requirements. The campaign flowchart 30 will assign offers to resulting segments, output the segments to the contact history table, and create the flat files 20 for the email and direct mail user lists. The campaign marketer saves the campaign flowchart 30 and returns to the campaign summary page. On the campaign summary page, the campaign marketer changes the eBay Marketing System (EMS) Publish Trigger from "New" to "Ready for Publish" and saves the campaign. This updates the data from "New" to "Ready" in a table, which can be used to trigger or publish a campaign. For example, the table UAC_CAMPAIGN.EMS_PUBLISH_TRIGGER can be used to trigger the campaign.

The campaign publishing system 100 is called, for example, every 5 minutes by a cron job process. The process calls the campaign publishing system 100 which queries the database and reads from the UAC_CAMPAIGN.EMS_PUBLISH_TRIGGER field for all records that are "Ready," (campaigns in a status of "Ready for Publish"). In this case, it will find the above campaign in a status of "ready," and campaign publishing system 100 will follow logic specific to an eBay Marketing System, in order to build the related Campaign and Offer metadata and send using XML over SOAP to the external EMS system. The campaign marketer is able to see the transfer was successful by refreshing their browser on the campaign summary page. If successful, campaign publishing system 100 will write a status message to a field of a table (for example, UAC_ CAMPAIGN), which is read by a campaign generation system 200 and displayed on the campaign summary page in the EMS success message field, for example "EMS Transfer Successful."

EMS is used for email content creation, and an EMS user updates a program created by the campaign metadata sent over from campaign publishing system 100. For example, the program name will be created with Campaign Name, the start date and end date will be as indicated in the campaign metadata. In addition, the offers sent from campaign publishing system 100 will appear as codes which can be appended to the URLs within the campaign content. Using the descriptive Offer Names, the EMS user knows to assign the US_ToysNewHotItem_08162006_JP offer code to the links specific to the Toy's Content or image. Same for the Apparel content or image. The EMS user will finalize the email content, save and send to the Email channel systems using FTP (File Transfer Protocol) for subsequent launch.

Now that the content is ready, all pre-steps have been completed the user can transfer the campaign metadata to the email and postal channel and run the campaign (for example, run the flowchart 30). The user will login to the campaign generation system 200 and navigate to the US_ToysMonthlyBuyer_08162006_JP campaign and select edit. On the campaign summary page, the user will change the value of Kana Publish Trigger from "New" to "Ready to Publish" and select Save. This will change a corresponding value in the field from New to Ready. A cron job is constantly running, calling the campaign publishing system 100 to scan the UAC_CAMPAIGN.Kana_Publish_trigger table for all Kana_publish_trigger="ready." If found, the campaign publishing system 100 will query for all related metadata and package the corresponding xml for the channel. In this case, channel is "KC1" (eBay.com, for example, has three email systems: KC1, KC2, and KC3). The campaign publishing system 100 will initiate a Web Service call passing the metadata as well formed XML to the email system's Web Service API. The user is able to see the transfer was successful by refreshing their browser on the campaign summary page. If successful, the campaign publishing system 100 will write a status message to the UAC_CAMPAIGN.KANA_SUCCESS_MESSAGE field which is read by campaign generation system 200 and displayed on the campaign summary page in the Kana Success Message Field, for example "Kana Successful Transfer."

The campaign marketer user can then navigate to the campaign flowchart and select "Run." This will cause the campaign generation system 200 to run the flowchart 30, which executes the pre-built queries against the database tables, pulls the matching users, and writes the user list to a flat file for Email and a different flat file for Postal as well as to the UAC_CONTACT_HISTORY table. Upon completion, the campaign generation system 200 will make a call to the campaign publishing system 100 to do two things. First, validate the content of the flat files meets business requirements. Second, transfer the validated flat files to the corresponding channel systems.

The campaign publishing system 100 performs validation on both the flat files 20, making sure that the flat files 20 are not empty, there are no abnormal characters in the fields, the flat files 20 are delimited correctly, and the metadata in the flat files 20 matches the metadata associated to the campaign. If all these checks pass, the flat files 20 are transferred using Secure Copy Protocol (SCP) from the server of campaign publishing system 100 to the KC1 email server and to the Postal server, respectfully.

At this point, the user may navigate to an email portion of the plurality of channel systems 300, find the corresponding campaign, associate the finished campaign content sent earlier from EMS, and launch the campaign. These actions cause the email system to send out email content to all customers on the campaign user list. Concurrently, an external postal catalog publisher may take the campaign publishing system postal flat file and use the corresponding customer name and addresses in this file for an eBay Catalog. The content of the catalog may be provided by an external vendor, and the postal catalog publisher will use their processes to associate customer name and address to catalog and send via postal mail. Thus, the campaign will be published to the potential customers.

Figure 8:
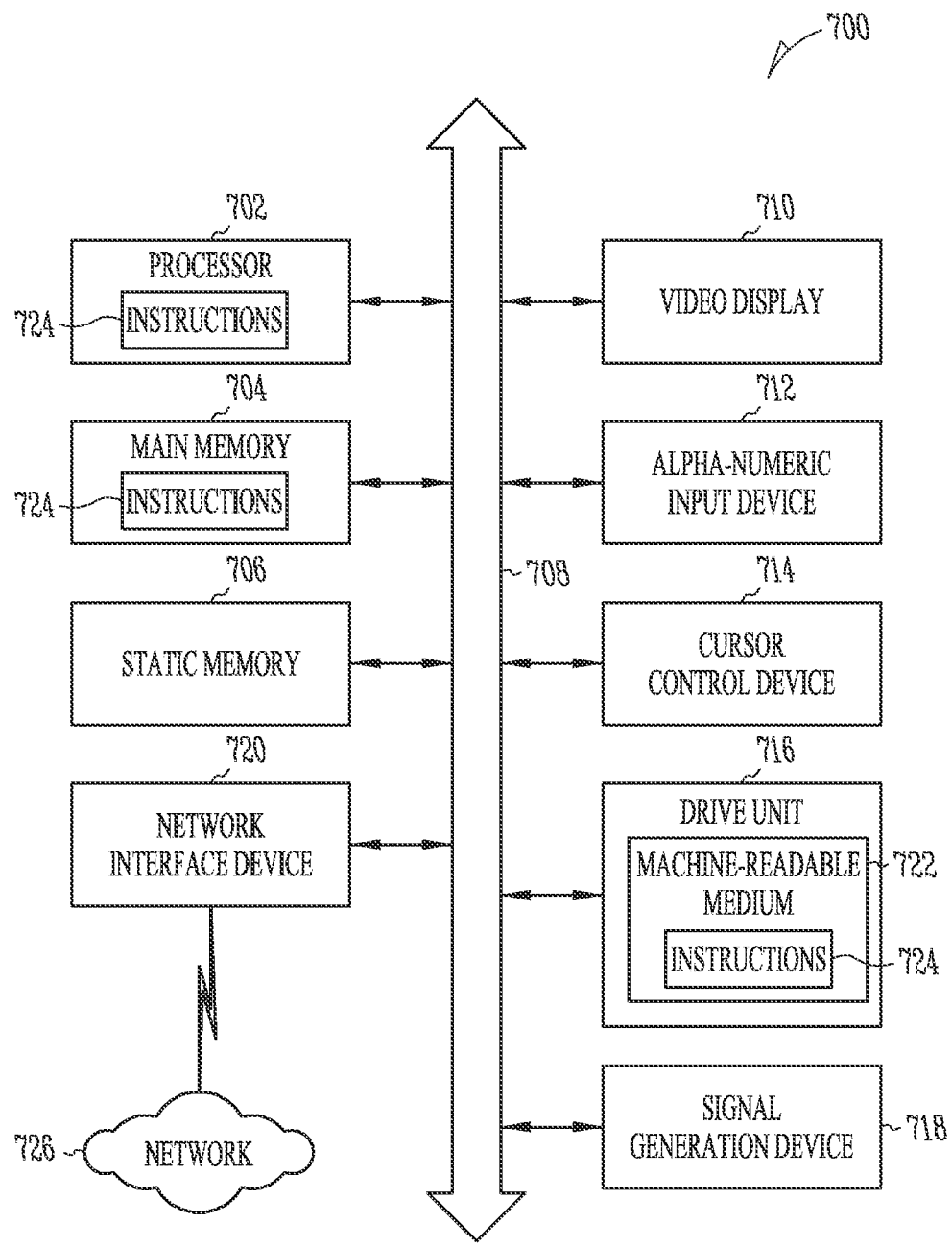
FIG. 8 is a block diagram illustrating a machine in the example form of a computer system, within which a set of sequence of instructions for causing the machine to perform any one of the methodologies discussed herein may be executed.

Referring now to FIG. 8, a block diagram illustrates a machine in the example form of a computer system 700, within which a set of sequence of instructions for causing the machine to perform any one of the methodologies discussed herein may be executed. In alternative exemplary embodiments, the machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions that specify actions to be taken by that machine. Further, while only a single machine is illustrated, the term "machine" shall also be taken to include any collection of machines that individually or jointly execute a set of instructions to perform any one or more of the methodologies discussed herein.

The example computer system 700 includes a processor 702 (for example, a central processing unit (CPU) a graphics processing unit (GPU) or both), a main memory 704 and a static memory 706, which communicate with each other via a bus 708. The computer system 700 may further include a video display unit 710 (for example, a liquid crystal display (LCD) or a cathode ray tube (CRT)). The computer system 700 also includes an alphanumeric input device 712 (for example, a keyboard), a cursor control device 714 (for example, a mouse), a disk drive unit 716, a signal generation device 718 (for example, a speaker) and a network interface device 720.

The disk drive unit 716 includes a machine-readable medium 722 on which is stored one or more sets of instructions (for example, software 724) embodying any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 via the network interface device 720.

While the machine-readable medium 722 is shown in an example exemplary embodiment to be a single medium, the term "machine-readable medium" should be taken to include a single medium or multiple media (for example, a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and a system to publish campaign metadata related to marketing campaigns and customer user lists to at least certain ones of the plurality of channel systems 300 has been described. Although the present invention has been described with reference to specific exemplary embodiments, it will be evident that various modifications and changes may be made to these exemplary embodiments without departing from the broader spirit and scope of the invention. Accordingly, the specification and drawings are to be regarded in an illustrative rather than a restrictive sense.

The invention claimed is:

1. A method of publishing campaign data in an electronic environment, the method comprising:
   querying a database to select campaign metadata ready to publish to a target channel system;
   determining a plurality of value users as a subset of all end users, the determining of the plurality of value users being based on a first set of pre-defined criteria, the plurality of value users being selected from at least one group from groups including both a group of high volume users of the electronic environment and a group of users negatively impacted by the electronic environment based on a negative purchase experience;
   automatically generating one or more coupons to be distributed to each of the plurality of value users, a value of the one or more coupons being based on a second set of pre-defined criteria;
   selecting the target channel system from a plurality of channel systems based on a target indicating attribute of the campaign metadata; and
   transferring both the metadata and any related flat files to the target channel system concurrently.

2. The method of claim 1 further comprising:
   determining whether the target channel system has a SOAP enabled web service API or whether the target channel system only accepts HTTP posts; and
      based on the target channel system having the SOAP enabled web service API, packaging the metadata as an XML message object;
      if the target channel system only accepts HTTP posts, packaging the metadata as an HTML request.

3. The method of claim 1 further comprising including the one or more coupons with the metadata prior to transferring to the target channel system.

4. The method of claim 1 further comprising forwarding the one or more coupons to each of the plurality of value users through a third party customer relationship management provider.

5. The method of claim 1 further comprising accessing the database through a third party customer relationship management provider.

6. The method of claim 1 further comprising, after querying the database, aggregating one or more offer metadata with the selected metadata.

7. A machine-readable storage device not having any transitory signals and including instructions that, when performed by a machine, cause the machine to perform operations to publish campaign data in an electronic environment, the operations comprising:
   querying a database to select campaign metadata ready to publish to a target channel system;
   determining a plurality of value users as a subset of all end users, the determining of the plurality of value users being based on a first set of pre-defined criteria, the plurality of value users being selected from at least one group from groups including both a group of high volume users of the electronic environment and a group of users negatively impacted by the electronic environment based on a negative purchase experience;
   automatically generating one or more coupons to be distributed to each of the plurality of value users, a value of the one or more coupons being based on a second set of pre-defined criteria;
   selecting the target channel system from a plurality of channel systems based on a target indicating attribute of the campaign metadata; and
   transferring the metadata to the target channel system.

8. The machine-readable storage device of claim 7, wherein the operations further comprise aggregating one or more offer metadata with the selected metadata.

9. The machine-readable storage device of claim 7, wherein the operations further comprise updating a status of transferred metadata in the database to identify that the metadata has been transferred successfully.

10. The machine-readable storage device of claim 7, wherein the operations further comprise:
    determining whether the target channel system has a SOAP enabled web service API or whether the target channel system only accepts HTTP posts; and
       based on the target channel system having the target channel system has the SOAP enabled web service API, packaging the metadata as an XML message object;
       if the target channel system only accepts HTTP posts, packaging the metadata as an HTML request.

11. A method of publishing campaign data in an electronic environment, the method comprising:
    selecting campaign metadata ready to publish to a target channel system;
    determining a plurality of value users as a subset of all end users, the determining of the plurality of value users being based on a first set of pre-defined criteria, the plurality of value users being selected from at least one group from groups including both a group of high volume users of the electronic environment and a group of users negatively impacted by the electronic environment;
    automatically generating one or more coupons to be distributed to each of the plurality of value users, a value of the one or more coupons being based on a second set of pre-defined criteria; and
    selecting the target channel system from a plurality of channel systems based on a target indicating attribute of the campaign metadata.

12. The method of claim 11 further comprising transferring the one or more coupons to the target channel system to be distributed to the plurality of value users.

13. The method of claim 11 further comprising forwarding the one or more coupons to the plurality of value users through a third party customer relationship management provider.

14. The method of claim 11 further comprising:
    determining whether the target channel system has a SOAP enabled web service API or whether the target channel system only accepts HTTP posts; and
       based on the target channel system having the target channel system has the SOAP enabled web service API, packaging the campaign metadata as an XML message object;
       if the target channel system only accepts HTTP posts, packaging the campaign metadata as an HTML request.

15. A machine-readable storage device not having any transitory signals and including instructions that, when performed by a machine, cause the machine to perform operations to publish campaign data in an electronic environment, the operations comprising:

selecting campaign metadata ready to publish to a target channel system;

determining a plurality of value users as a subset of all end users, the determining of the plurality of value users being based on a first set of pre-defined criteria, the plurality of value users being selected from at least one group from groups including both including a group of high volume users of the electronic environment and a group of users negatively impacted by the electronic environment;

automatically generating one or more coupons to be distributed to the plurality of value users, a value of the one or more coupons being based on a second set of pre-defined criteria; and selecting the target channel system from a plurality of channel systems based on a target indicating attribute of the campaign metadata.

16. The machine-readable storage device of claim 15 wherein the operations further comprise transferring the one or more coupons to the target channel system to be distributed to the plurality of value users.

17. The machine-readable storage device of claim 15 wherein the operations further comprise forwarding the one or more coupons to the plurality of value users through a third party customer relationship management provider.

18. A network-based system to publish campaign data in an electronic environment, the system comprising:

a database to store campaign metadata having an attribute indicating a target channel system from a plurality of channel systems; and at least one processor to
write to and read from the database;
select campaign metadata ready to publish to the target channel system;
determine a plurality of value users from a subset of all end users, the determination of the plurality of value users being based on a first set of pre-defined criteria, the plurality of value users being selected from at least one group from groups including both a group of high volume users of the electronic environment and a group of users negatively impacted by the electronic environment;
automatically generate one or more coupons to be distributed to the plurality of value users, a value of the one or more coupons being based on a second set of pre-defined criteria; and
select the target channel system from the plurality of channel systems based on a target indicating attribute of the campaign metadata associated with the campaign data.

19. The network-based system of claim 18 further comprising an interface port to electronically communicate with a plurality of third party customer relationship management providers.

20. The network-based system of claim 18 wherein the processor is further configured to transfer both the metadata and any related flat files to the target channel system concurrently.

* * * * *